United States Patent [19]
Lin

[11] Patent Number: 6,108,437
[45] Date of Patent: Aug. 22, 2000

[54] FACE RECOGNITION APPARATUS, METHOD, SYSTEM AND COMPUTER READABLE MEDIUM THEREOF

[75] Inventor: Shang-Hung Lin, San Jose, Calif.

[73] Assignee: Seiko Epson Corporation, Tokyo, Japan

[21] Appl. No.: 09/026,970

[22] Filed: Feb. 20, 1998

Related U.S. Application Data

[60] Provisional application No. 60/066,282, Nov. 14, 1997.

[51] Int. Cl.[7] .................................................. G06K 9/00
[52] U.S. Cl. ........................................ 382/118; 382/217
[58] Field of Search ................................... 382/117, 118,
382/157, 291, 116, 155, 156, 158, 159,
190, 209, 199, 217, 218; 340/825.34; 348/77,
78; 380/23

[56] References Cited

U.S. PATENT DOCUMENTS

| | | |
|---|---|---|
| 5,012,522 | 4/1991 | Lambert . |
| 5,164,992 | 11/1992 | Turk et al. . |
| 5,450,504 | 9/1995 | Calia . |
| 5,497,430 | 3/1996 | Sadovnik et al. . |
| 5,625,704 | 4/1997 | Prasad ...................................... 382/118 |
| 5,634,087 | 5/1997 | Mammone et al. . |
| 5,675,663 | 10/1997 | Koerner et al. . |
| 5,715,325 | 2/1998 | Bang et al. ............................... 382/118 |
| 5,835,616 | 11/1998 | Lobo et al. ............................... 382/118 |
| 5,850,470 | 12/1998 | Kung et al. ............................... 382/157 |
| 5,852,669 | 12/1998 | Eleftheriadis et al. .................. 382/118 |
| 5,892,837 | 4/1999 | Luo et al. ................................. 382/117 |
| 5,905,807 | 5/1999 | Kado et al. ............................... 382/118 |

FOREIGN PATENT DOCUMENTS 0 805 416  11/1997  European Pat. Off. .

OTHER PUBLICATIONS

IEEE Transactions On Neural Networks, vol. 8, No. 1, Jan. 1997, "Face Recognition/Detection by Probabilistic Decision–Based Neural Network", Shuang–Hung Lin, Sun–Yuan Kung, and Long–Ji Lin, pp. 114–132.

IEEE, "Remembering the Past: The Role of Embedded Memory in Recurrent Neural Network Architectures", C. Lee Giles, Tsungnan Lin, Gill G. Horne, pp. 34–43.

IEEE Transactions on Signal Processing; vol. 45, No. 11, Nov. 1997; "A Delay Damage Model Selection Algorithm for NARX Neural Networks"; Tsung–Nan Lin, et al. pp. 2719–2730.

*Primary Examiner*—Jon Chang
*Assistant Examiner*—Vikkram Bali
*Attorney, Agent, or Firm*—Eric B. Janofsky

[57] ABSTRACT

A face recognition system is provided comprising an input process or circuit, such as a video camera for generating an image of a person. A face detector process or circuit determines if a face is present in a image. A face position registration process or circuit determines a position of the face in the image if the face detector process or circuit determines that the face is present. A feature extractor process or circuit is provided for extracting at least two facial features from the face. A voting process or circuit compares the extractor facial features with a database of extracted facial features to identify the face.

90 Claims, 12 Drawing Sheets

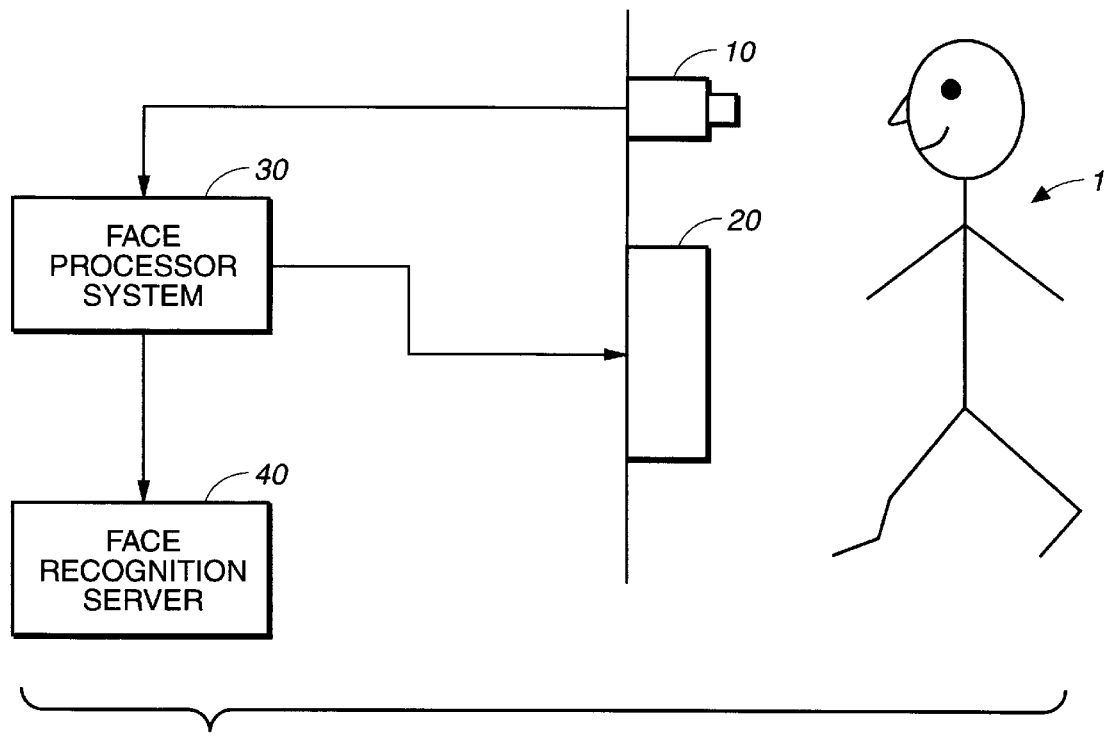
FIG._1
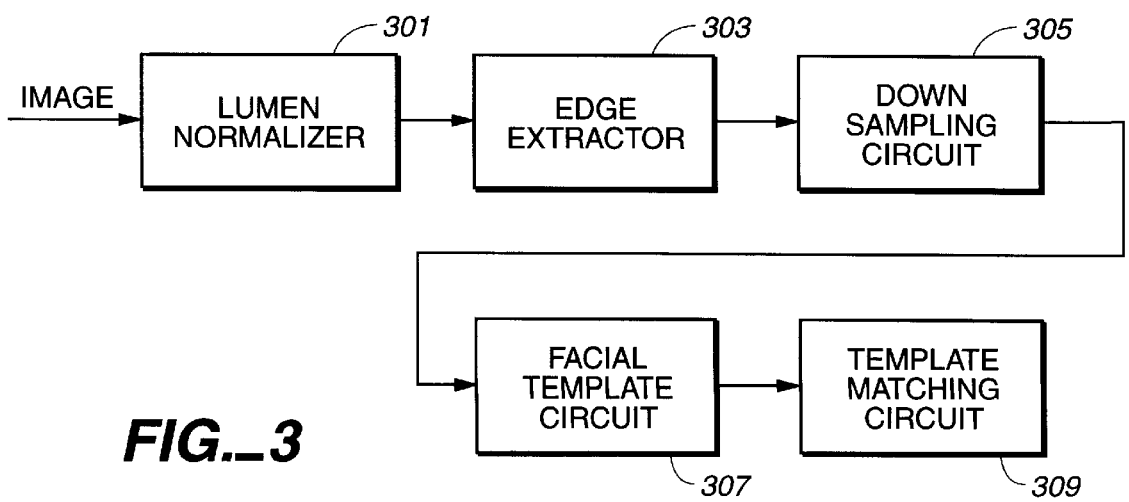
FIG._3

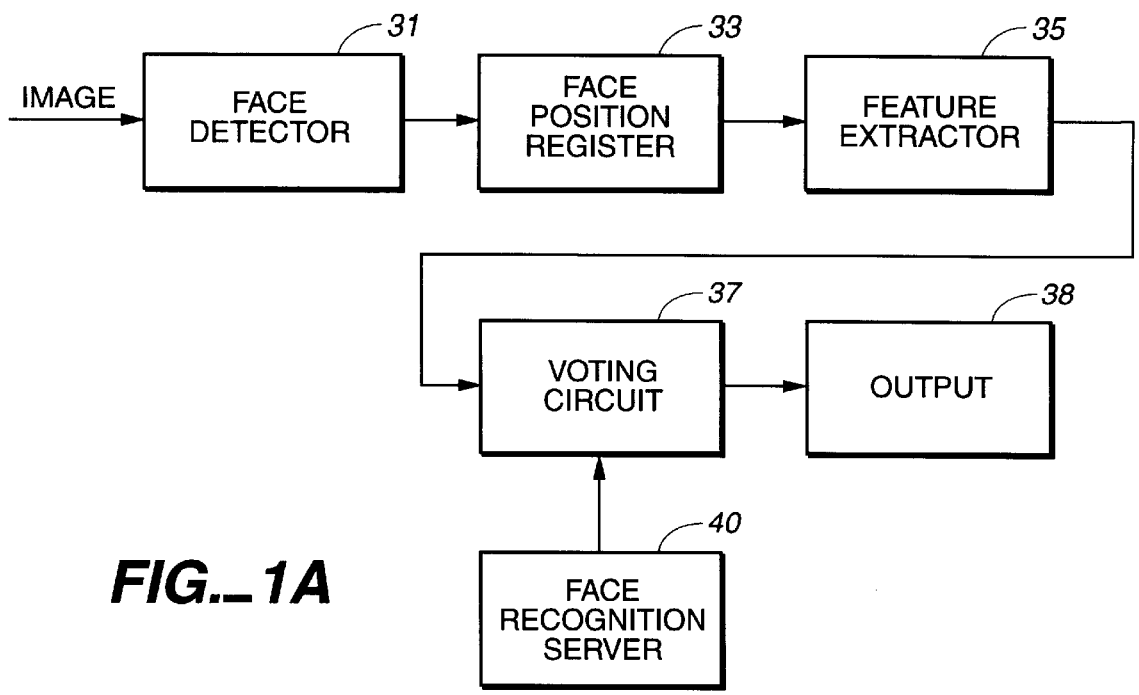
FIG._1A
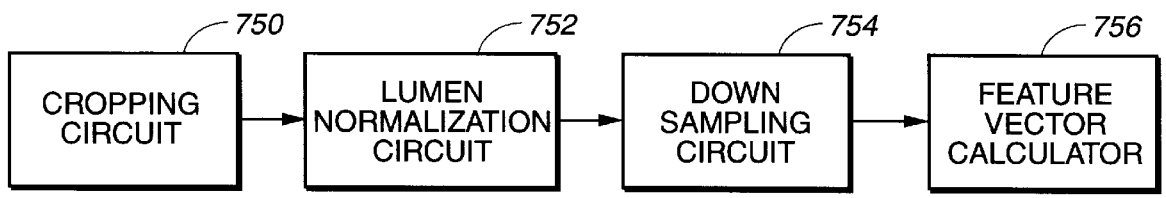
FIG._7A

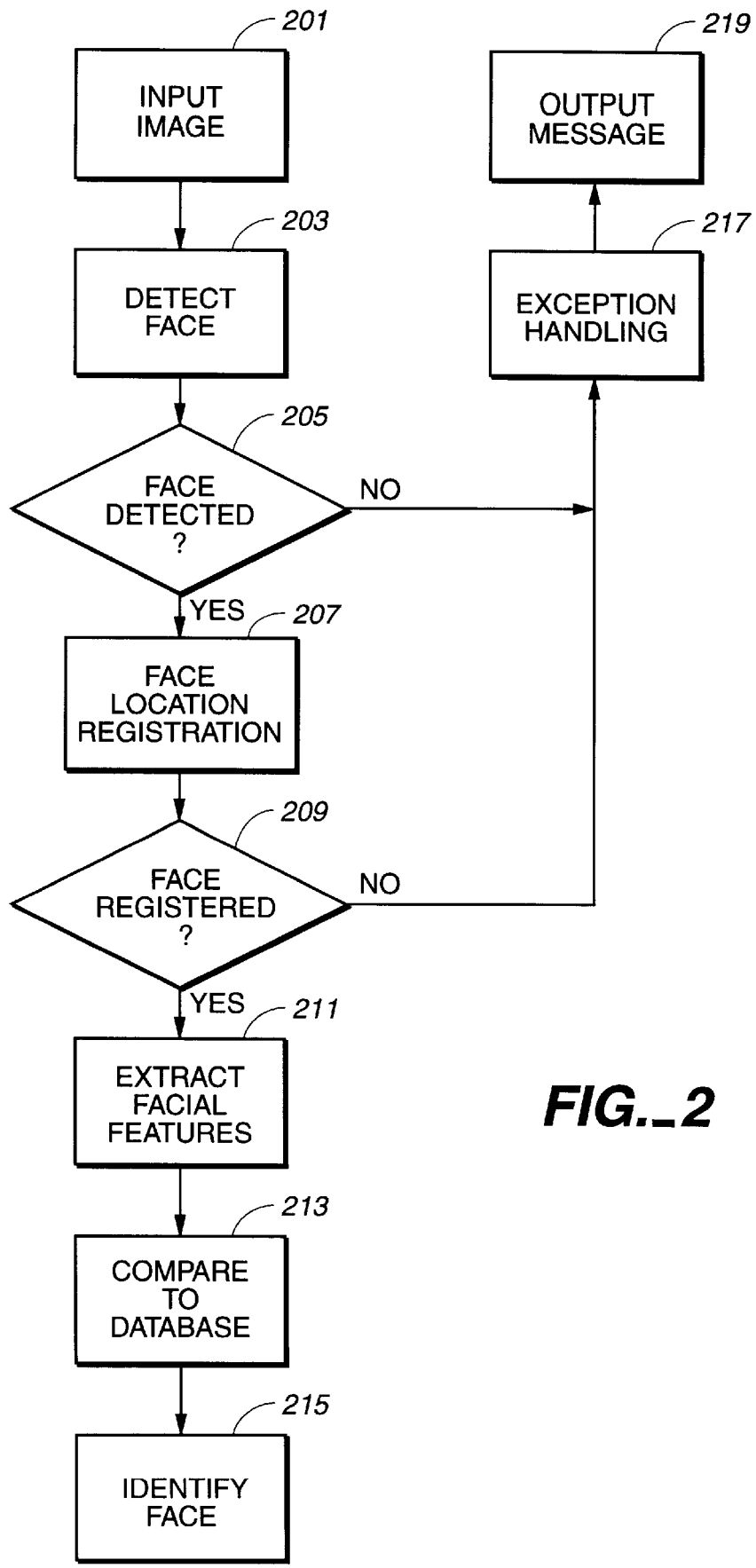
FIG._2

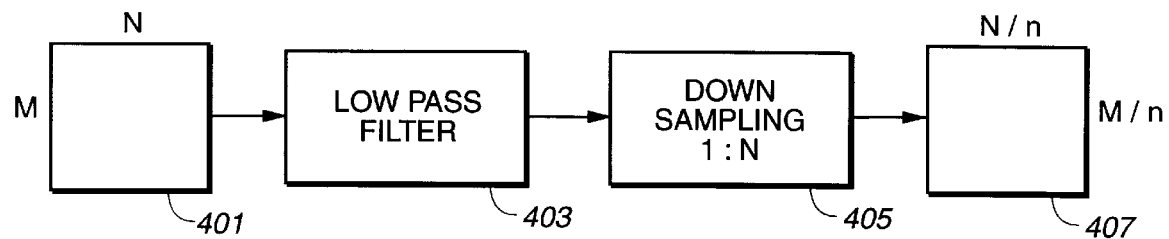
FIG._4
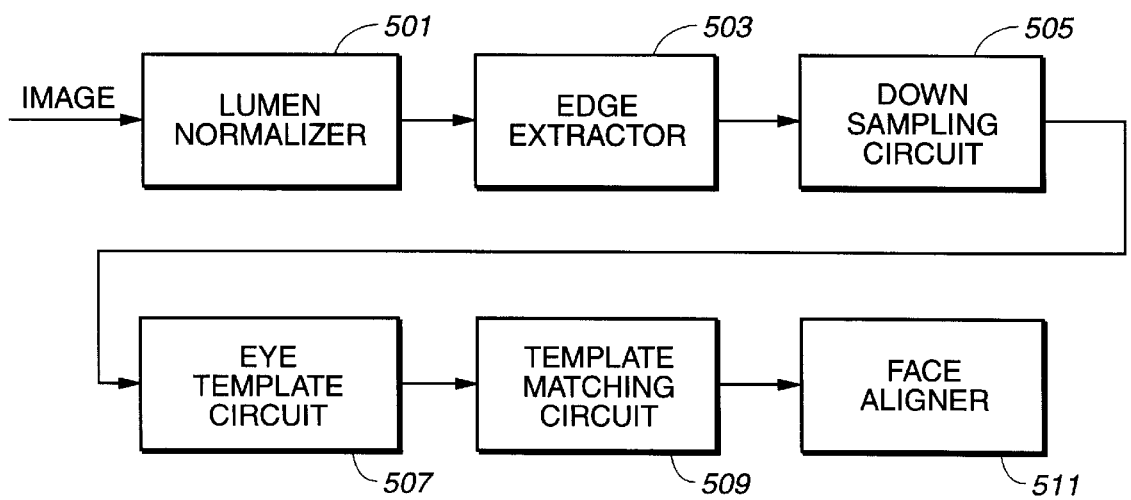
FIG._5

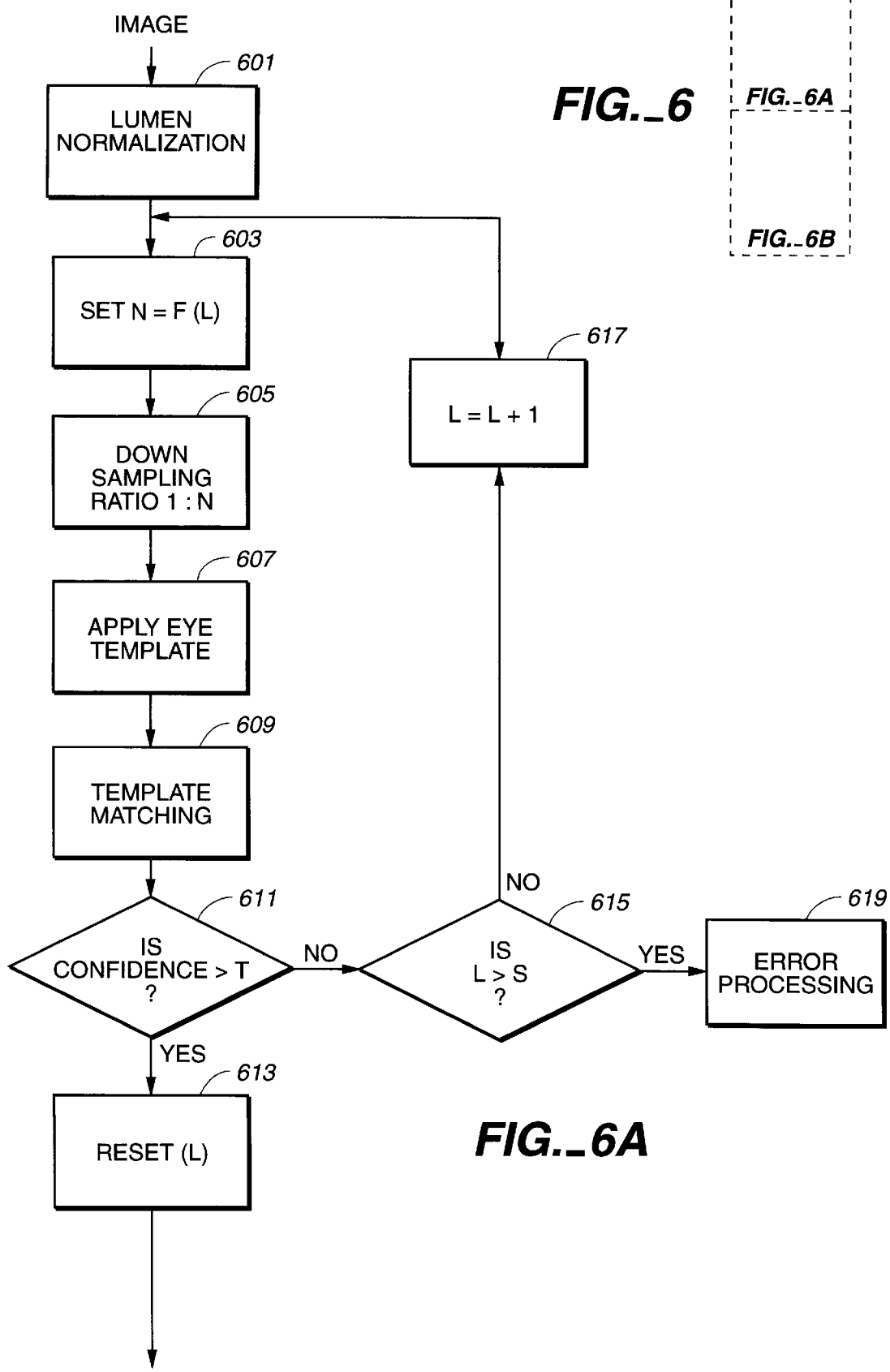
FIG._6A

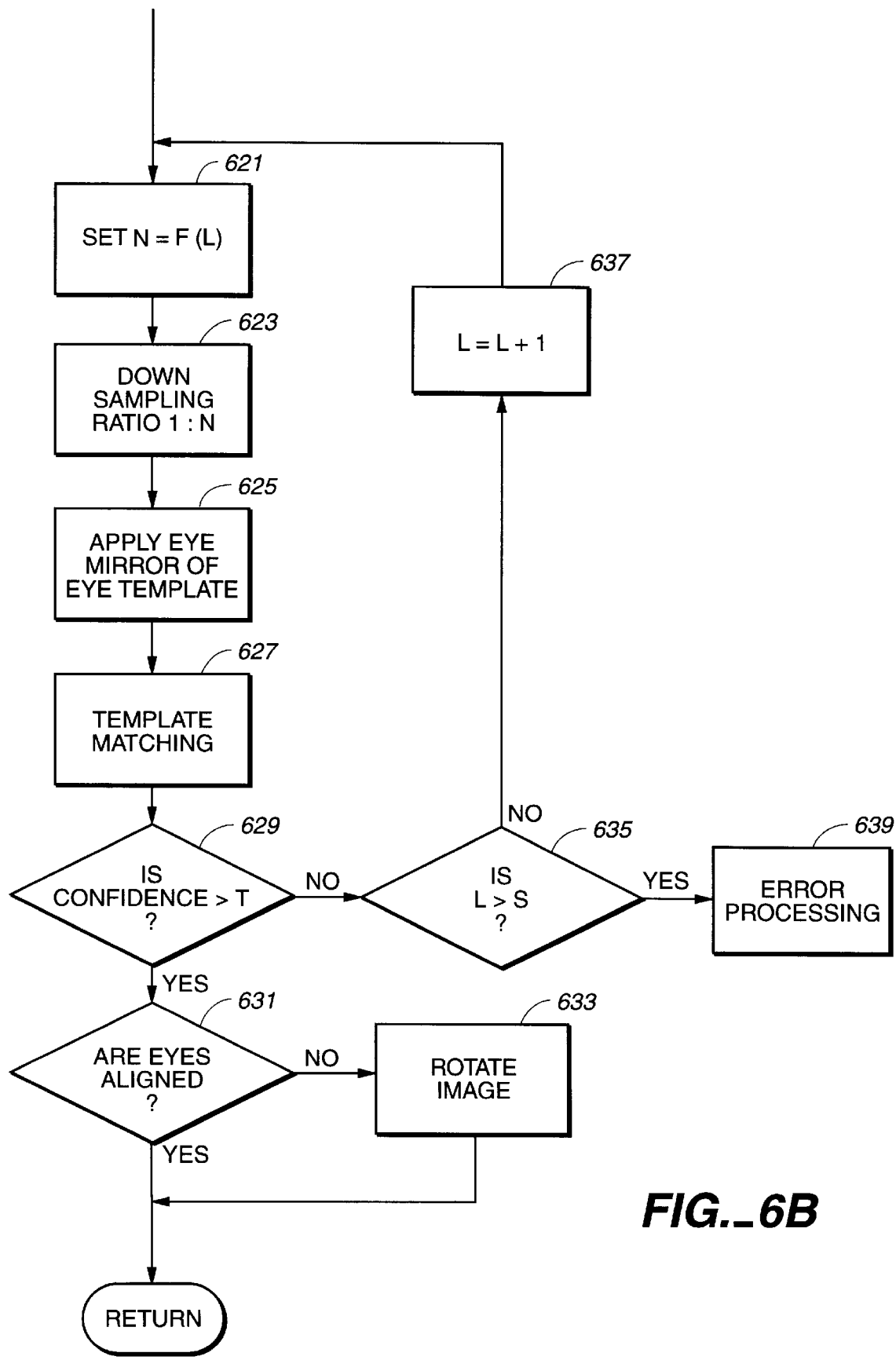
FIG._6B

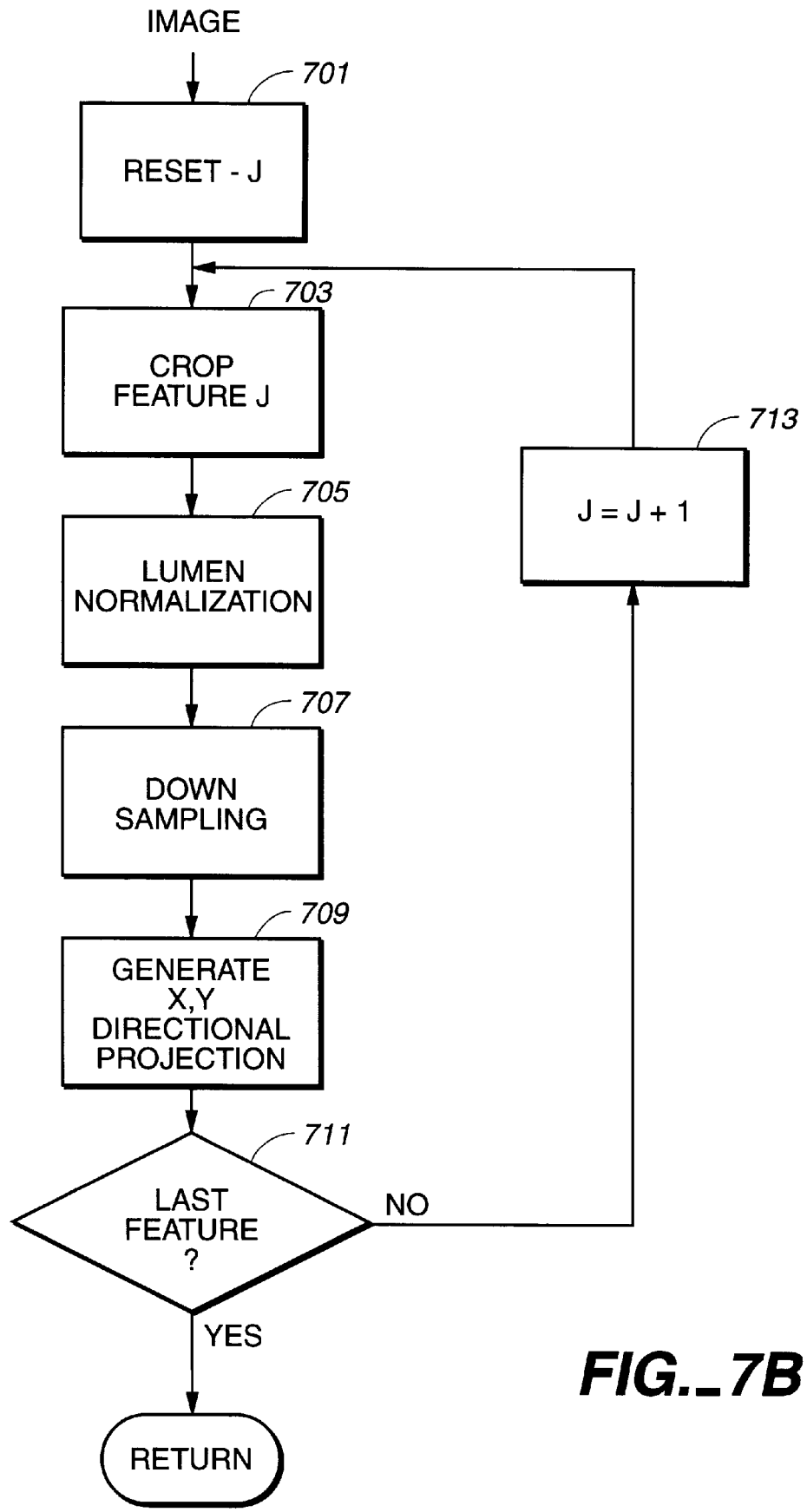
FIG._7B

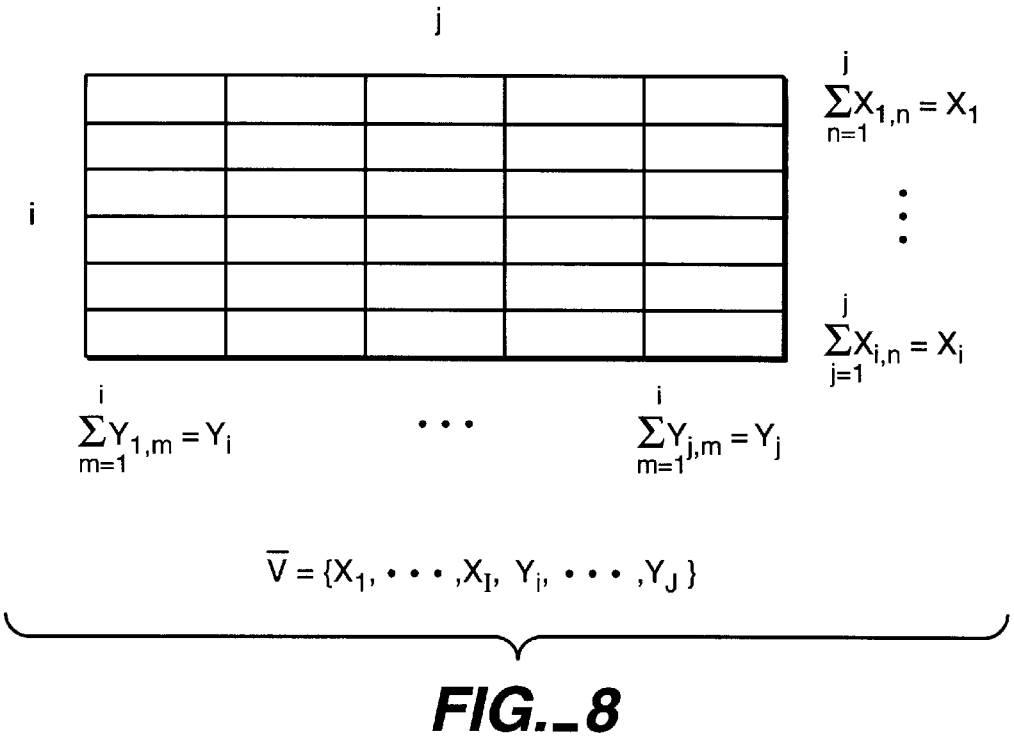
FIG._8
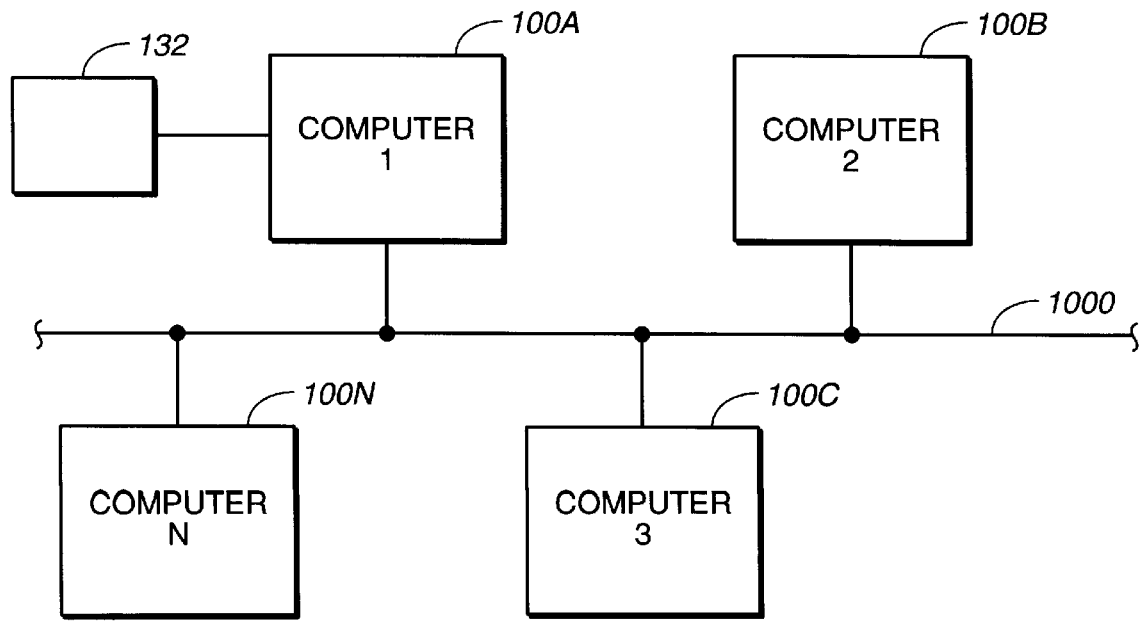
FIG._13

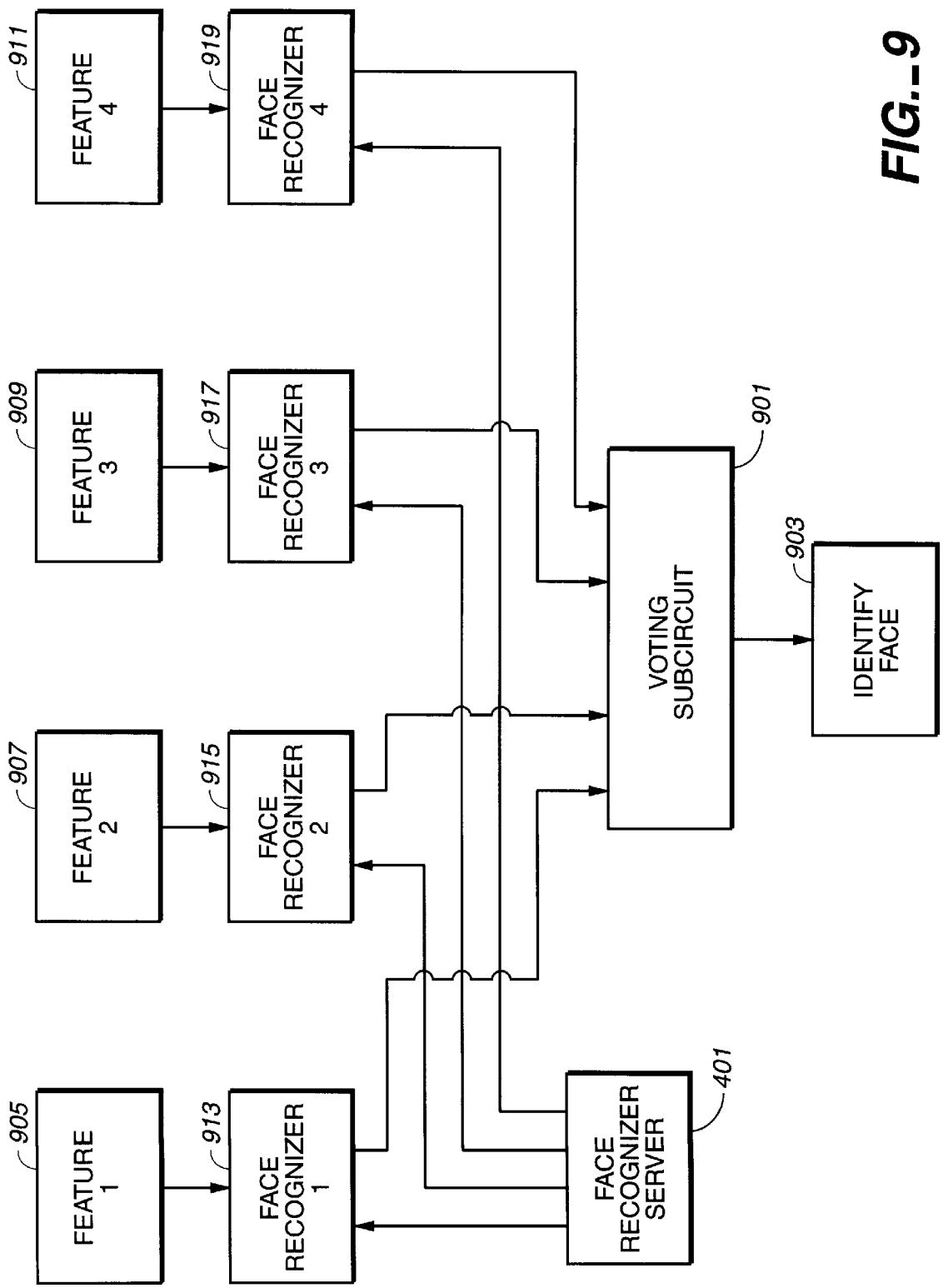
FIG._9

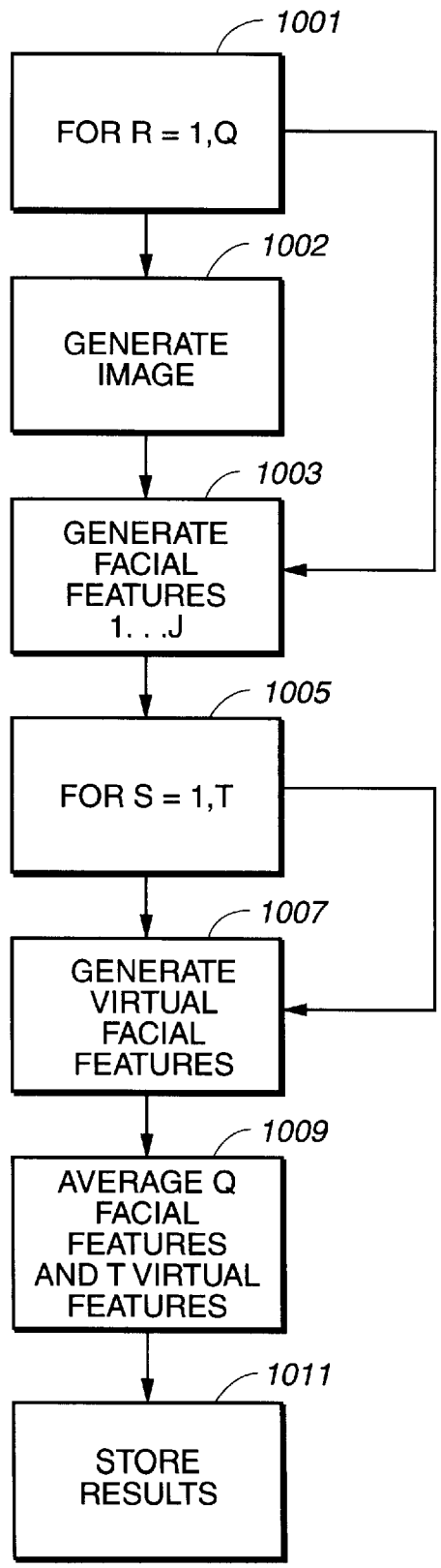
FIG._10

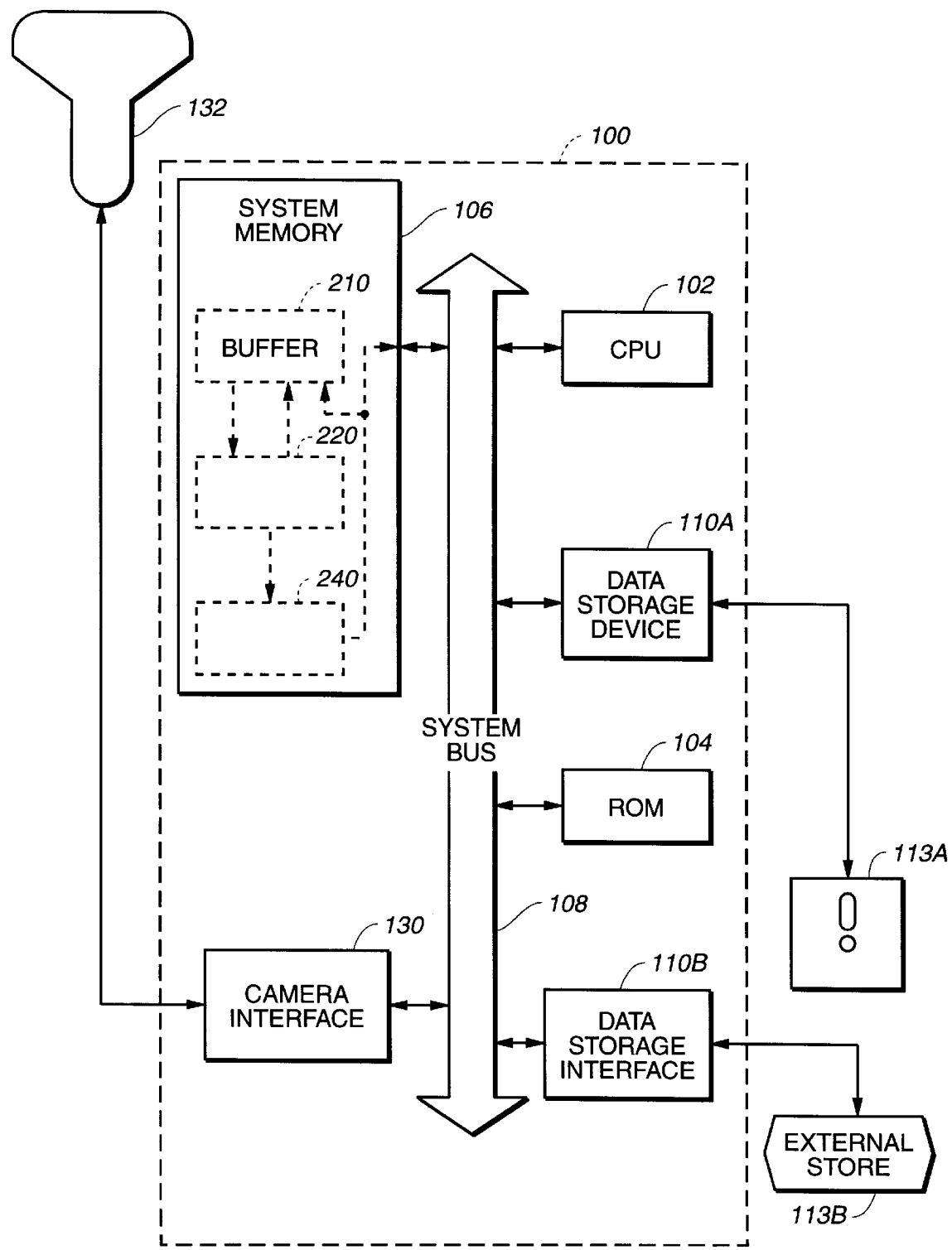
FIG._11

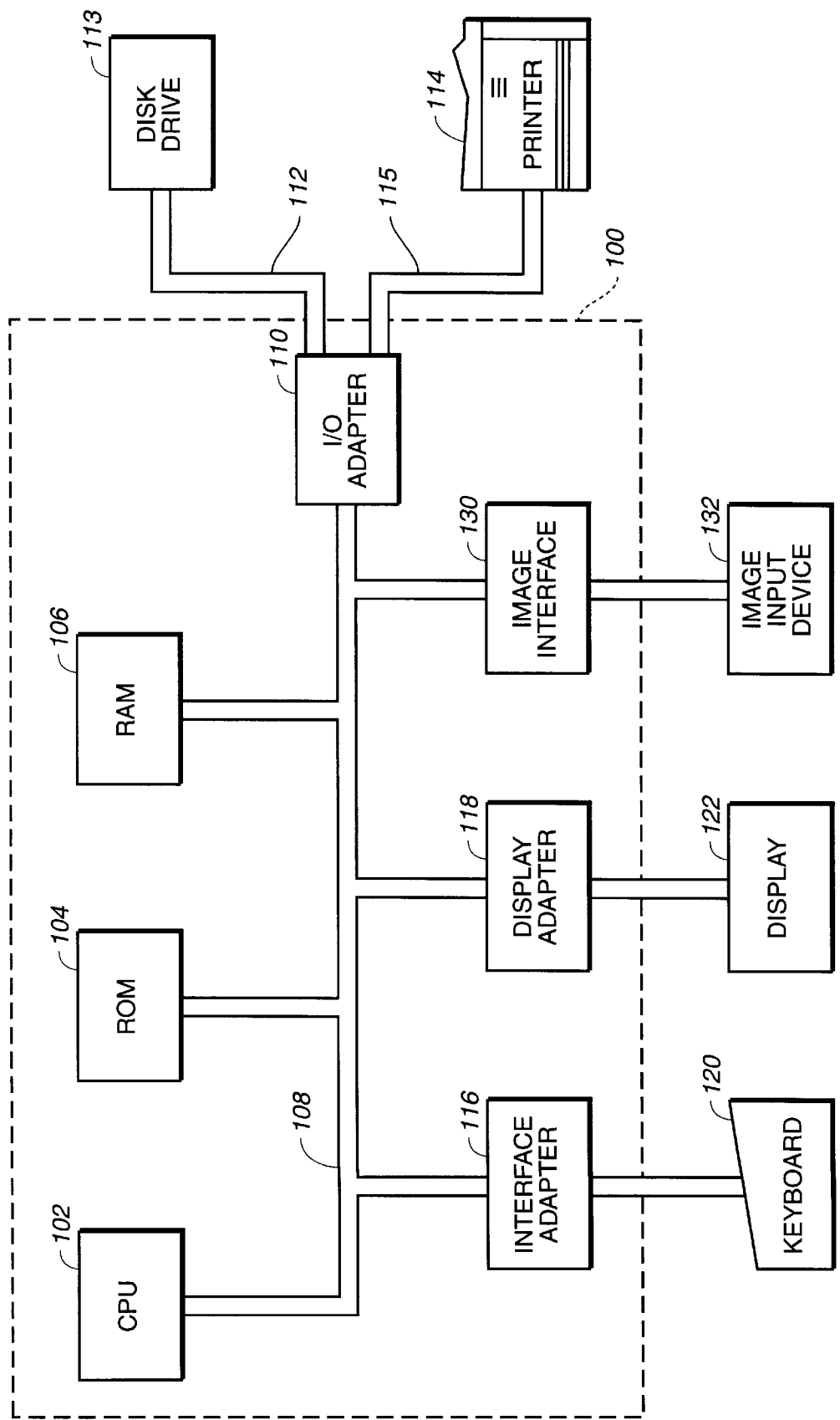
FIG._12

FACE RECOGNITION APPARATUS, METHOD, SYSTEM AND COMPUTER READABLE MEDIUM THEREOF

Applicant claims priority under 35 U.S.C. § 119 (e) to provisional application Ser. No. 60/066,282, filed on Nov. 14, 1997, entitled Face Recognition Apparatus, Method, System and Computer Readable Medium Thereof.

BACKGROUND OF THE INVENTION

1. Field of the Invention

This invention relates generally to a method and system for machine recognition of an image. More particularly, this invention relates to an apparatus, a method, a system and a computer readable medium for automatic recognition a human face and then an identification of the recognized face from a database of previously stored face data.

2. Description of the Related Art

Machine vision has many commercial applications and therefore, has attracted much attention in recent years. Many machine vision techniques and methods have been developed for detecting various image patterns and objects including deformable objects such as human faces. The ability to recognize a human face is an important machine vision problem. Face recognition applications are numerous, as well as diverse.

Face recognition applications can be used, for example, by security agencies, law enforcement agencies, the airline industry, the border patrol, the banking and securities industries and the like. Examples of potential applications include but are not limited to entry control to limited access areas, access to computer equipment, access to automatic teller terminals, identification of individuals and the like.

Present face recognition methods used in person identification systems, typically employ a face recognizer which determines the identity of a human face image. In order to identify the image, the system compares the face to other faces stored in a database. Systems used in many visual monitoring and surveillance incorporate a process whereby the system determines the position of the human eyes from an image or an image sequence containing the human face. Once the position of the eyes is determined, all of other important facial features, such as the position of the nose and the mouth, are determined by methods that (1) use correlation templates, (2) spatial image invariants, (3) view-based eigen spaces, etc. The use of one of these methods enables the system to recognize a face from a given face database, and can also be used to perform a variety of other related tasks.

One problem associated with conventional recognition techniques is somewhat inaccurate identification of the human face under analysis. In other words, the face is either misidentified or not identified at all. Moreover, some of these techniques require significant computation time to recognize and identify a face. The conventional solution to this problem has been accepting slow recognition time or using more power and therefore expensive computation equipment.

OBJECTS OF THE INVENTION

Therefore, it is an object of the present invention to overcome the aforementioned problems.

It is a further object of the present invention to provide a method, system, apparatus and computer readable medium for accurately recognizing and identifying a human face from a face database.

It is an additional object of the present invention to provide a method, system, apparatus and computer readable medium for which extracts at least two facial features and then selects one of the features for use in the identification.

SUMMARY OF THE INVENTION

According to this invention, a face recognition system is provided comprising an input process or circuit, such as a video camera for generating an image of a person. A face detector process or circuit determines if a face is present in a image. A face position registration process or circuit determines a position of the face in the image if the face detector process or circuit determines that the face is present. A feature extractor process or circuit is provided for extracting at least two facial features from the face. A voting process or circuit compares the extractor facial features with a database of extracted facial features to identify the face.

According to another aspect of the present invention, the face detector is provided with a lumen normalization circuit for lumen normalizing the output by the input circuit. An edge extractor extracts edge information from an output of the lumen normalization circuit; A down sampling circuit is provided for down sampling at a predetermined ratio an output signal from the edge extraction circuit. A facial template circuit for applies a plurality of facial templates to an output of the down sampling circuit. A facial template matching circuit for determines which one of the plurality of facial templates corresponds to the output of the down sampling circuit.

According to an additional aspect of the present invention, the face position registration circuit is provided with a lumen normalization circuit for lumen normalizing an output by the face detector circuit. An edge extractor extracts edge information from an output of the lumen normalization circuit, and a down sampling circuit down samples at a first predetermined ratio an output signal from the edge extraction circuit. An eye template circuit applies a plurality of eye templates to an output of the down sampling circuit, and an eye template matching circuit determines which one of the plurality of eye templates corresponds to the output of the down sampling circuit. A face alignment circuit aligns the face of the image output by the input unit in accordance with the eye matching circuit.

According to a further aspect of the present invention, the feature extractor is provided with a cropping circuit for cropping at least the first facial feature and the second facial feature output by the face position registration circuit. A lumen normalization circuit is provided for lumen normalizing the first facial feature and the second facial feature output by the cropping circuit. An edge extractor extracts edge information from the first facial feature and the second facial feature output by the lumen normalization circuit. A down sampling circuit down samples at a first predetermined ratio the first facial feature and at a second predetermined ratio the second facial feature output signal by the edge extraction circuit. A feature vector calculating circuit for calculating a first feature vector of the first facial feature from the down sampling circuit and a second feature vector of the second facial feature output from said down sampling circuit.

According to a still further aspect of the present invention, the voting circuit comprises a first recognizer circuit for comparing the first feature vector with corresponding first feature vectors of a database of candidates. A second recognizer circuit for compares the second feature vector with corresponding second feature vectors of the database of candidates, and a selection circuit of selects one of the candidates in the database in accordance with one of the first recognizer circuit and the second recognizer circuit.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1 is a schematic representation of a preferred embodiment in accordance with the present invention;

FIG. 1A is a schematic representation of the face detector system of FIG. 1;

FIG. 2 is a flow chart of the preferred embodiment of FIG. 1;

FIG. 3 is a block diagram of the face recognition process or circuit of the preferred embodiment of FIG. 1;

FIG. 4 is a block diagram of the down sampling process or circuit of the preferred embodiment of FIG. 1;

FIG. 5 is a block diagram of the face location registration process or circuit of the preferred embodiment of FIG. 1;

FIGS. 6A and 6B as shown together in FIG. 6 are flow charts of the face location registration circuit of FIG. 5;

FIG. 7A is a block diagram of the feature extraction process or circuit of the preferred embodiment of FIG. 1;

FIG. 7B is a flow chart of the feature extractor of the preferred embodiment of FIG. 1;

FIG. 8 is a exemplary diagram illustrating the method of generating a feature vector;

FIG. 9 is a block diagram of the voting process or circuit of the preferred embodiment of FIG. 1;

FIG. 10 is a flow chart of a routine for generating face data in the face recognition server of the preferred embodiment of FIG. 1;

FIG. 11 illustrates in more detail a representative processing system;

FIG. 12 is a block diagram of a computer system, for example, a personal computer system on which a face recognition application program in accordance with the present invention can operate; and FIG. 13 is a schematic diagram of distribute processing implementation of the present invention.

DESCRIPTION OF THE PREFERRED EMBODIMENTS

The present invention is preferably practiced in the context of an application program performed by a computer such as the x86 compatible computer (a.k.a. IBM compatible), Apple Macintosh computer, Sun engineering work station and the like. The present invention consists of primarily three major functions, namely image acquisiaton, face database processing and face recognition processing, as will be explained in detail herein below.

A representative hardware environment is depicted in FIG. 12, which illustrates a typical hardware configuration of a computer 100 in accordance with the subject invention. The computer or processing system 100 is controlled by a central processing unit (CPU) 102, which may be at least one conventional microprocessor; a number of other units, all interconnected via a system bus 108, are provided to accomplish specific tasks. Although a particular computer may only have some of the units illustrated in FIG. 12 or may have additional components not shown, most computers will include at least the units shown.

Specifically, computer 100 shown in FIG. 12 includes a random access memory (RAM) 106 for temporary storage of information such as instructions and data, a read only memory (ROM) 104 for permanent storage of the computer's configuration and basic operating commands and an input/output (I/O) adapter 110 for connecting peripheral devices such as a disk unit 113 and printer 114 to the bus 108, via cables 115 and 112, respectively. Disk unit 113, among other functions, stores the face recognition application software and a database of face information for processing by CPU 102. Image input device 132 is also connected to bus 108 via interface 130 for acquiring an image containing a face. Image input device 132 can convert an image to data usable by CPU 102. Image input device 132 may be implemented by a video camera, a digital still camera, a flat bed scanner and the like. Alternatively, the image input device may be replaced by a communication channel to another computer or computer network having previously stored images thereon. A user interface adapter 116 is also provided for connecting input devices, such as a keyboard 120, and other known interface devices including mice, speakers and microphones to the bus 108. Visual output is provided by a display adapter 118, which connects the bus 108 to a display device 122 such as a video monitor. Computer 100 has resident thereon, and is controlled and coordinated by, an operating system.

FIG. 11 is another illustration of computer 100, which includes system memory or RAM 106, CPU 102 and camera or image input device 132 interconnected via a system bus 108 well known in the computer arts. Also interconnected to the system bus 108 is system-addressable storage device 110A and data storage interface 110B capable of accepting, reading and writing information to a type of removable media 113A and external store 113B as representative storage mediums in communication with representative processing system 100. Accordingly, in this representative processing system, programming instructions corresponding to the face recognition processing may be partially or fully contained within external store 113A, removable media 113B, or system memory 106 or ROM 104 as is well known in the art.

Moreover, buffer 223 and buffer 210 may be constructed within system memory 106 as an integral part thereof or may comprise discrete circuitry as is well-known in the computing arts.

Removable media 113A may include a floppy disk, CD-ROM, ROM cartridge or other apparatus suitable for holding information in computer readable form. Similarly, external store 113B may include another processing system, a computer readable storage component, a collection or network of processing systems and/or storage components, or similar device or devices in communication with processing system 2000 to exchange information including the above-mentioned thread instructions. Further, in this embodiment, processing system 100 is indicated as being a general purpose personal computer. However, one of ordinary skill with knowledge of the presently preferred embodiment according to the present invention should know that the particular processing system could alternatively include, for example, a special-purpose dedicated micro-controlled subsystem or similar processing device as long as it has sufficient resources for at least execution of the techniques described and charted hereinbelow and has sufficient interfacing resources to communicate and exchange information with the image input member or camera 10. In this system, image acquisition, face recognition processing and database processing are performed on a single computer.

In another approach, as shown in FIG. 13, a distributed processing model may be implemented. In this approach, various components of the face recognition system are processed on different computers 100A, 100B, 100C . . . 100N. These computers communicate with each other through a well know networking system. As can be appreciated by one of ordinary skill in the art, these computers may reside at the same location or at different locations. In this approach, for example, image acquisition may be processed by computer 100A, face recognition may be performed on computer 100B and a database processing may be performed on computer 100B.

Details of each of these components will be presented herein below.

Reference is now made to FIGS. 1 and 1A which show the general configuration of the face recognition system in accordance with the preferred embodiment of the present invention. As will be appreciated by one of ordinary skill in the art, the functional blocks shown in these and other figures are divided arbitrarily in this specification for convenience of description only. Other arrangements are also possible.

FIG. 1 illustrates, a subject 1 positioned in the view of camera 10 for acquiring an image thereof. Camera 10 may also be implemented by a multi-frame video camera capable of capturing multiple, sequential images over a period of time. Alternatively, a scanner (not shown), other suitable video input device or digitizer may be substituted for camera 10 to perform face recognition from a previously recorded image, such as a photograph. In another embodiment, a video tape recorder can be employed as a video input device to input video images recorded by a video camera used by, for example, a surveillance system. These devices may provide analog or digital image signals. Of course, analog image signals need to be converted by an analog to digital converter using conventional techniques. Such an image is represent by M×N pixels and is stored in memory of the system.

After subject 1 is appropriately positioned, subject 1 may manually initiate camera 10 to acquire an image or take a picture thereof by using interactive panel 20. Alternatively, the face recognition system may comprise a proximity sensor (not shown) for automatically acquiring an image when subject 1 is properly positioned in the field of vision of camera 10. Interactive panel 20 may consist of a display panel (such as a CRT or LCD display) and keyboard either an actual keyboard or softkeys located on the display panel. Interactive panel 20 may also display the image taken by camera 10. In simpler applications, interactive panel 20 may consist of lights, sound making apparatuses and/or switches.

The output of camera 10 is provided to face processor system 30 for recognition and identification. Face processor system 30 may be implemented by programming a general purpose computer described above with appropriate application software stored in a computer readable medium, discrete components, application specific integrated circuits and the like or any combination thereof.

Face processor system 30 extracts a set of features from the image output by camera 10 and compares these features with a database of features stored in face recognition server 40. Upon identification of the face, face processor system 30 can perform a variety of activities depending on the application of this system. For example, upon identification, subject 1 could be allowed access into a building or a computer.

Face processor system 30 can also provide communication and control with interactive panel 20 and camera 10. Specifically, as noted above, subject 1, can interact with interactive panel 20 to initiate image acquisition. Face processor system 30, upon receipt of an initiation signal from panel 20, provides a signal to camera 10 to acquire an image. Face processor system 30 could also provide exception signals to interactive panel, for example, notifying the subject to realign himself before camera 10 to take another image. A detailed explanation of the face processor system 30 will be provided hereinbelow.

Face processor system 30 interfaces with face recognition server 40. Face recognition server 40 stores a database containing facial characteristics of potential candidates for matching. Face recognition server 40 compares the features extracted by face processor system 30 and finds, if possible, statistically a matching face. Of course, if the database is of the appropriate size, the database may be stored in the processor system 30 instead of the separate face recognition server 40.

FIG. 1A shows the general configuration of face processor system 30, and FIG. 2 is a flow chart of the method implemented by this system. Face processor system 30 comprises a face detector 31 for determining if the image from camera 10 (step 201) contains an image of a face (step 203). If no face image is present (step 205), face processor system 30 performs exception handling, by for example, displaying a message on interactive panel 20. This message may include instructions for subject 1 to reposition himself for retaking the picture by camera 10. Once face detector 31 determines that a face is present in the image, face position registrator 33, determines the location of the face in the image (step 207). Face position registrator 33 also determines if the face is properly aligned. If there is misalignment, the image is realigned, by for example rotation. Misalignment of the face may occur if subject 1 is not position perpendicular to camera 10 or if his head tilted. If the face can not be detected or is significantly out of alignment such that the face could not be properly registered (step 209), face position registrator 33 initiates the exception handling process (step 217). Again, a message can be sent to interactive panel 20 to display a message with instructions for subject 1 to align his head for retaking the picture by camera 10.

Once face position registrator 33 determines the location of the face, facial features of the face are extracted by feature extractor 35 (step 211). Feature extractor 35 extracts a variety of facial features by generating feature vectors, each representing a respective feature. In the preferred embodiment the features extracted include feature 1—an eye, feature 2—nose and both eyes, and feature—3 mouth, nose and both eyes. Of course other facial features and combinations may be used. Feature extractor circuit 35 assigns a confidence level to each of the extracted features using a neural network or statistical analysis approach. In the preferred embodiment a Probabilistic Decision-Based Neural Network (PDBNN) is implemented. Such a PDBNN is described in, for example, "Face Recognition/Detection by Probabilistic Decision-Based Neural Network", *IEEE Transaction on Neural Networks*, Vol. 8, No. 1, pages 116–132, January 1997, the entire contents of which are incorporated herein by reference. The confidence level indicates the degree of degree of certainty that feature extractor 35 extracted the appropriate feature. In the preferred embodiment, three confidence levels are assigned, one for each of features 1, 2 and 3, respectively. Face recognition server 40 stores the same number of features extracted by feature extractor 35 for each potential candidate. In the preferred embodiment, face recognition server 40 stores three facial features for each potential candidate. A detailed description will be provided hereinbelow with respect to FIG. 10 on how to develop the database. Voting circuit 37 provides each of the feature vectors extracted by feature extractor 35 to face recognition server 40 (step 213). Face recognition server 40 selects the stored feature vectors with the highest level of confidence based statistical analysis techniques (step 215). Of course in an alternate embodiment, the face recognition server may be part of face processor system 30 instead of as a separate processor.

There are a variety of ways the result the identification may be utilized by output device 38 depending on the application of the face recognition system. For example in a simple application, if an authorized subject is recognized, a door can be unlock to allow the person access to a building. Alternatively, if an authorized subject is recognized, that subject is allowed access to a computer. This system can replace or supplement conventional password schemes. In another embodiment, a recognized subject can be authorized to purchase goods and/or services at an actual store or on the Internet. In a more complex application, the preferred embodiment can identify subjects from images taken by a surveillance camera and provide such identification to the appropriate persons.

FIG. 3 provides a detailed explanation of face detector 31. As shown therein, the image acquired by camera 10 is processed by lumen normalizer 301 to perform lumen normalization or histogram equalization to compensate for any wide variation in illumination of the image of human being 100. This circuit can increase the dynamic range of the image. One such lumen normalization method is discussed in European Patent Application 0,805,416 A2. The image is then processed by edge extractor 303 to determine the edge of the face in the image.

The image is then processed by down sampling circuit to reduce the number of pixels processed without decreasing the effectiveness of this system while reducing the amount of computational power required. In general the down sampling reduces the number of pixels in a ratio of 1:n. In the preferred embodiment, the down sampling ratio is 1:8. FIG. 4 shows in more detail the down sampling circuit. Initially, image data represented by M×N pixels (401) is filtered by a low pass filter (403) using conventional techniques. At this point the image is raster scanned, and every $n^{th}$ pixel is read and then rewritten into buffer 210 (405). As a result of this circuit, new data consisting of M/n×N/n pixels are stored in the buffer 223 (407).

Turning back to FIG. 3, after the image is down sampled, predefined facial templates are applied to the down sampled image by facial template circuit 307. These predefined templates represent facial characteristics, and may be stored in a read only memory (ROM), main computer memory, disk memory and the like or any combination thereof. The facial templates were developed using neural network techniques as discussed above or statistical analysis methods. Template matching circuit 309 compares the facial templates to the downsized image and determines if a match occurs. In other words, template matching circuit 309 determines whether a face exists in the image. The position of the face is recorded in memory. If a face exists processing proceeds; otherwise the exception handling procedure is executed, as shown in FIG. 2.

Turning back to FIG. 1A and as noted above, after the image is processed by face detector 31, the image, in accordance with the position of the face stored in memory, is then processed by face position registrator 33. FIG. 5 shows in more detail face position registrator 33. Face position registrator 33 comprises lumen normalizer 501, edge extractor 503 and down sampling circuit 505. These circuits are similar to those of face detector 31 and no further detailed discussion will be presented.

After the down sampling by down sampling circuit 505, the image is processed by eye template circuit 507. Predefined eye templates are applied to the down sampled image thereof. These predefined eye templates represent eye characteristics, and may be stored in a read only memory (ROM), main computer memory, disk memory and the like or any combination thereof. The eye templates were also developed using neural network techniques. Template matching circuit 509 compares the eye templates to the downsized image and determines if a match occurs. If a match occurs, its position is recorded; otherwise the exception handling procedure, as discussed above, is then executed. Face aligner 511 judges if the face is properly aligned by determining if an imaginary line connecting the eyes is parallel to the horizontal direction of the image. If possible the image is rotated to bring the face into alignment; otherwise the exception handling procedure is then executed.

FIG. 6A and 6B are flow charts illustrating the operation of face position registrator 33. As noted above, the image is lumen normalized (step 601). A down sampling ratio is then selected (step 603) and the image is then down sampled in accordance with the selected ratio (step 605). An eye template for one eye, for example the right eye, is applied to the image (step 607) and template matching is then performed (step 609). If there is a match, that is if the confidence level is greater that a predetermined threshold, then processing proceed to the other eye. Otherwise this processing is repeated with the ratio of the down sampling changed by incrementing an index counter (step 617) to apply the next ratio. Thus steps 603, 605, 607, 609 and 611 are repeated. It is noted that there are S possible different down sampling ratios. If there is still not a match (step 609) and all S down sampling ratios have been used, then the exception handling procedure, as discussed above, is then executed.

The operation of face position registrator 33 continues for detecting the other eye, by processing a mirror image of the eye template. In step 613 the down sampling index is reset and steps 621, 623, 625, 627, 629, 635, 637 and 639 are processed similarly to steps 603, 605, 607, 609, 611, 615, 617 and 619, respectively. Thus no further discussion of these steps need be provided. Alternatively, an eye template having both eyes may be utilized instead.

Once both eyes have been detected, face position registrator 33 determines if the eyes are horizontally aligned. If they are aligned the face position registrator 33 has finished processing. Otherwise, the image is rotated to bring it into horizontal alignment. Additionally, the location of the eyes are stored for later use by feature extractor 35.

FIG. 7A is a block diagram of the feature extractor and FIG. 7B is a flow chart thereof the operation of feature extractor circuit 35. As noted above, in the preferred embodiment there are three facial features to be extracted by feature extractor 35. Initially, the first feature, is selected for extraction from the image (step 701). In accordance with the location of the face detected by face detector 31, the first feature, namely, both eyes, mouth and nose area of the image, is cropped by cropper 750 (step 703). Lumen normalization is performed on the cropped image by lumen normalizer 752 (step 707) and then that image is down sampled by down sampling circuit 754 (step 707). The down sampling ratio of down sampling circuit 754 is dependent on the feature being extracted. The following chart shows the feature vs. down sampling ratio in accordance with the preferred embodiment:

| Feature | Down Sampling Ratio |
|---|---|
| single eye | 1:1.1 |
| eyes and nose | 1:1.25 |
| eyes, nose and mouth | 1:1.5 |

In step 709 the x,y directional projection or feature vector is calculated by feature vector calculator 756. FIG. 8 illustrates the calculation by feature vector calculator 756 of the feature vector in which an M×N image is downsize to an I×J image. For each row, the values of each of the elements in a row are summed as shown in equation (1) to form the $X_i$ components of the feature vector.

$$X_i = \sum_{j=1}^{j=J} x_j \quad (1)$$

Similarly, for each column, the values of each of the elements in a column are summed as shown in equation (2) to form the $Y_j$ components of the feature vector.

$$Y_j = \sum_{i=1}^{i=I} y_i \quad (2)$$

The feature vector comprises the set of X components form 1 to I and Y components from 1 to J as shown in equation (3).

$$\overline{V} = \{X_1 \ldots X_I, Y_1 \ldots Y_J\} \quad (3)$$

Steps 703–709 are repeated for each of the features by incrementing the feature index (step 713).

Referring to FIG. 9, upon completion of extracting all of the features (step 711), the feature vectors are passed onto voting circuit 37. Voting processor 37 comprises one face recognizer (913, 915, 917, 919) for each of the features (905, 907, 909 and 910). An inquiry is made of face recognition server 40 to find the closest set of feature vectors. In this circuit a confidence level for each of the features vectors (905, 907, 909 and 910) with relation to the closest stored feature vectors is determined. The voting sub circuit 901 selects the stored set of feature vectors based on the highest confidence level. This stored set of feature vectors represents the person having the recognized face from the database of candidates and the face is identified (903). Output processing is performed by output 38 as described above.

FIG. 10 illustrates a process in accordance the present invention for creating and storing feature vectors in the face recognition server of each candidate. Initially an image of a subject is generated similarly as described above (step 1002). In step 1003, the features of the subject's face are generated similarly to the process described above by the face detector 31, face position registrator 33 and feature extractor 35. Since these circuits are quite similar, no additional explanation is provided here. The image is generated Q times (step 1001) for slightly varied poses by the subject, and real feature vectors for each pose are then generated. A set of virtual feature vectors is then generated based on computer generated variations of the real feature vectors (steps 1005 and 1007). An average is taken of the real feature vectors and the virtual feature vectors (step 1009). This result is then stored in face recognition server 40 (step 1011) to represent one candidate. This process is repeated for each candidate.

As will be appreciated by one of ordinary skill in the art, after obtaining a fuller understanding of the present invention, may recognize other types of objects or other features of subject 10 using similar techniques as discussed herein.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A face recognition system comprising:
   an input unit for inputting an image of a subject;
   a face detector for determining if a face is present in the image from said input circuit;
   a face position registration circuit for determining a position of the face in the image if said face detector determines that the face is present, said face position registration circuit comprising an eye template circuit that applies an eye template to a first side of the face and a mirror image of the eye template to a second side of the face;
   a feature extractor for extracting at least first and second facial features from the face in accordance with the position determined by said face position registration circuit; and
   a voting circuit for comparing the at least two extracted facial features with a database of candidates corresponding facial features to identify the face.

2. A face recognition system according to claim 1, wherein said face detector comprises:
   a lumen normalization circuit for lumen normalizing the output by said input circuit;
   an edge extractor for extracting edge information from an output of said lumen normalization circuit;
   a down sampling circuit for down sampling at a predetermined ratio an output signal from said edge extraction circuit;
   a facial template circuit for applying a plurality of facial templates to an output of said down sampling circuit; and
   a facial template matching circuit for determining which one of the plurality of facial templates corresponds to the output of said down sampling circuit.

3. A face recognition system according to claim 2, wherein the image output by said input device comprises M×N pixels, wherein M and N are positive integers,
   wherein said down sampling circuit comprises:
   a low pass filter to filter the M×N pixels;
   a down sampler for sampling every $n^{th}$ pixel from said low pass filter to output M/n×N/n pixels, wherein n is a positive integer.

4. A face recognition system according to claim 1, wherein said face position registration circuit comprises:
- a lumen normalization circuit for lumen normalizing an output by said face detector circuit;
- an edge extractor for extracting edge information from an output of said lumen normalization circuit;
- a down sampling circuit for down sampling at a first predetermined ratio an output signal from said edge extraction circuit;
- an eye template circuit for applying a plurality of eye templates to an output of said down sampling circuit;
- an eye template matching circuit for determining which one of the plurality of eye templates corresponds to the output of said down sampling circuit; and
- face alignment circuit for aligning the face of the image output by said input unit in accordance with said eye matching circuit.

5. A face recognition system comprising:
- an input unit for inputting an image of a subject;
- a face detector for determining if a face is present in the image from said input circuit;
- a face position registration circuit for determining a position of the face in the image if said face detector determines that the face is present, said face position registration circuit comprising:
  - a lumen normalization circuit for lumen normalizing an output by said face detector circuit;
  - an edge extractor for extracting edge information from an output of said lumen normalization circuit;
  - a down sampling circuit for down sampling at a first predetermined ratio an output signal from said edge extraction circuit;
  - an eye template circuit for applying a plurality of eye templates to an output of said down sampling circuit;
  - an eye template matching circuit for determining which one of the plurality of eye templates corresponds to the output of said down sampling circuit; and
  - a face alignment circuit for aligning the face of the image output by said input unit in accordance with said eye matching circuit;
- a feature extractor for extracting at least first and second facial features from the face in accordance with the position determined by said face position registration circuit; and
- a voting circuit for comparing the at least two extracted facial features with a database of candidates corresponding facial features to identify the face;
- wherein said eye template circuit applies an eye template to a first side of the face and a mirror image of the eye template to a second side of the face.

6. A face recognition system according to claim 4, wherein said eye template circuit applies an eye template comprising a right eye and a left eye.

7. A face recognition system comprising:
- an input unit for inputting an image of a subject;
- a face detector for determining if a face is present in the image from said input circuit;
- a face position registration circuit for determining a position of the face in the image if said face detector determines that the face is present, said face position registration circuit comprising:
  - a lumen normalization circuit for lumen normalizing an output by said face detector circuit;
  - an edge extractor for extracting edge information from an output of said lumen normalization circuit;
  - a down sampling circuit for down sampling at a first predetermined ratio an output signal from said edge extraction circuit;
  - an eye template circuit for applying a plurality of eye templates to an output of said down sampling circuit;
  - an eye template matching circuit for determining which one of the plurality of eye templates corresponds to the output of said down sampling circuit; and
  - face alignment circuit for aligning the face of the image output by said input unit in accordance with said eye matching circuit;
- a feature extractor for extracting at least first and second facial features from the face in accordance with the position determined by said face position registration circuit; and
- a voting circuit for comparing the at least two extracted facial features with a database of candidates corresponding facial features to identify the face;
- wherein if said eye matching circuit does not determine that any one of the plurality of eye templates corresponds to the output of said down sampling circuit, said down sampling circuit down samples at a second predetermined ratio the output signal from said edge extraction circuit.

8. A face recognition system comprising:
- an input unit for inputting an image of a subject;
- a face detector for determining if a face is present in the image from said input circuit;
- a face position registration circuit for determining a position of the face in the image if said face detector determines that the face is present;
- a feature extractor for extracting at least first and second facial features from the face in accordance with the position determined by said face position registration circuit; and
- a voting circuit for comparing the at least two extracted facial features with a database of candidates corresponding facial features to identify the face;
- wherein said feature extractor comprises:
  - a cropping circuit for cropping at least the first facial feature and the second facial feature output by said face position registration circuit;
  - a lumen normalization circuit for lumen normalizing the first facial feature and the second facial feature output by said cropping circuit;
  - an edge extractor for extracting edge information from the first facial feature and the second facial feature output by said lumen normalization circuit;
  - a down sampling circuit for down sampling at a first predetermined ratio the first facial feature and at a second predetermined ratio the second facial feature output signal by said edge extraction circuit; and
  - a feature vector calculating circuit for calculating a first feature vector of the first facial feature from said down sampling circuit and a second feature vector of the second facial feature output from said down sampling circuit.

9. A face recognition system according to claim 8, wherein the first predetermined ratio is greater than the second predetermined ratio.

10. A face recognition system according to claim 8, wherein the first facial feature comprises a single eye.

11. A face recognition system according to claim 8, wherein the second facial feature comprises both eyes and nose.

12. A face recognition system according to claim 8,
wherein said cropping circuit crops a third facial output by said face position registration circuit;
wherein said lumen normalization circuit lumen normalizes the third facial feature output by said cropping circuit detector circuit;
wherein said edge extractor extracts edge information from the third facial feature output by said lumen normalization circuit;
wherein said down sampling circuit down samples at a third predetermined ratio the third facial feature output by said extraction circuit; and
wherein said feature vector calculating circuit calculates a third feature vector of the third facial feature from said down sampling circuit.

13. A face recognition system according to claim 12, wherein the third facial feature comprises both eyes, nose and mouth.

14. A face recognition system according to claim 12, wherein the first predetermined ratio is greater than the second predetermined ratio, and wherein the second ratio is greater than the third ratio.

15. A face recognition system according to claim 8, wherein said voting circuit comprises:
a first recognizer circuit for comparing the first feature vector with corresponding first feature vectors of the database of candidates;
a second recognizer circuit for comparing the second feature vector with corresponding second feature vectors of the database of candidates; and
a selection circuit of selecting one of the candidates in the database in accordance with one of said first recognizer circuit and said second recognizer circuit.

16. A face recognition system comprising:
an input unit for inputting an image of a subject;
a face detector for determining if a face is present in the image from said input circuit;
a face position registration circuit for determining a position of the face in the image if said face detector determines that the face is present;
a feature extractor for extracting at least first and second facial features from the face in accordance with the position determined by said face position registration circuit; and
a voting circuit for comparing the at least two extracted facial features with a database of candidates corresponding facial features to identify the face;
wherein said feature extractor comprises:
a cropping circuit for cropping at least the first facial feature and the second facial feature output by said face position registration circuit;
a down sampling circuit for down sampling at a first predetermined ratio the first facial feature and a second predetermined ratio the second facial feature output signal by said cropping circuit; and
a feature vector calculating circuit for calculating a first feature vector of the first facial feature from said down sampling circuit and a second feature vector of the second facial feature output from said down sampling circuit.

17. A face recognition system according to claim 16, wherein the first predetermined ratio is greater than the second predetermined ratio.

18. A face recognition system according to claim 16, wherein said cropping circuit crops a third facial output by said face position registration circuit;
wherein said down sampling circuit down samples at a third predetermined ratio the third facial feature output by said cropping circuit; and
wherein said feature vector calculating circuit calculates a third feature vector of the third facial feature from said down sampling circuit.

19. A face recognition system according to claim 18, wherein the first predetermined ratio is greater than the second predetermined ratio, and wherein the second ratio is greater than the third ratio.

20. A face recognition system according to claim 18, wherein the third facial feature comprises both eyes, nose and mouth.

21. A face recognition system according to claim 16, wherein said voting circuit comprises:
a first recognizer circuit for comparing the first feature vector with corresponding first feature vectors of a database of candidates;
a second recognizer circuit for comparing the second feature vector with corresponding second feature vectors of the database of candidates; and
a selection circuit of selecting one of the candidates in the database in accordance with one of said first recognizer circuit and said second recognizer circuit.

22. A face recognition system according to claim 16, wherein the first facial feature comprises a single eye.

23. A face recognition system according to claim 16, wherein the second facial feature comprises both eyes and nose.

24. A face recognition system according to claim 1, wherein said input unit comprises a video camera.

25. A face recognition system according to claim 1, wherein said input unit comprises a digital camera.

26. A face recognition system according to claim 1, wherein said input unit comprises a memory comprising an image.

27. A face recognition system according to claim 1, wherein the first facial feature comprises a single eye.

28. A face recognition system according to claim 1, wherein the second facial feature comprises both eyes and nose.

29. A face recognition system according to claim 1, wherein said face detector comprises a neural network.

30. A face recognition system according to claim 1, wherein said face position registration circuit comprises a neural network.

31. A face recognition system according to claim 1, wherein said feature extractor comprises a neural network.

32. A face recognition system comprising:
an input unit for inputting an image of a subject;
a face position registration circuit for determining a position of a face in the image from said input circuit, said face position registration circuit comprising an eye template circuit for applying an eye template to a first side of the face and a mirror image of the eye template to a second side of the face;
a feature extractor for extracting at least first and second facial features from the face; and
a voting circuit for comparing the first and second facial features extracted by said feature extractor circuit with a database of extracted facial features to identify the face.

33. A face recognition system according to claim 32, wherein said input unit comprises a video camera.

34. A face recognition system according to claim 32, wherein said input unit comprises a digital camera.

35. A face recognition system according to claim 32, wherein said input unit comprises a memory comprising an image.

36. A face recognition system according to claim 32, wherein the first facial feature comprises a single eye.

37. A face recognition system according to claim 32, wherein the second facial feature comprises both eyes and nose.

38. A face recognition system according to claim 32, wherein said face position registration circuit comprises a neural network.

39. A face recognition system according to claim 32, wherein said feature extractor comprises a neural network.

40. A method of face recognition comprising the steps of:
    (a) inputting an image of a subject;
    (b) determining if a face is present in the image output of step (a);
    (c) determining a position of the face in the image if step (b) determines that the face is present including applying an eye template to a first side of the face and a mirror image of the eye template to a second side of the face;
    (d) extracting at least first and second facial features from the face output by step (c); and
    (e) comparing the first and second facial features output by step (d) to identify the face with a database of facial features.

41. A method according to claim 40, wherein step (b) comprises the steps of:
    (b1) lumen normalizing the output of step (a);
    (b2) extracting edge information from an output step (b1);
    (b3) down sampling at a first predetermined ratio an output of step (b2);
    (b4) applying a plurality of facial templates to an output of step (b3); and
    (b5) determining which one of the plurality of facial templates corresponds to the output of step (b4).

42. A method according to claim 41,
    wherein the output of step (b2) comprises M×N pixels, wherein M and N are positive integers,
    wherein step (b2) comprises the steps of:
        (b2I) low pass filtering the M×N pixels;
        (b2II) sampling every $n^{th}$ pixel from (b2I) to output M/n×M/n pixels, wherein n is a position integer.

43. A method according to claim 40, wherein step (c) comprises the steps of:
    (c1) lumen normalizing an output of step (b);
    (c2) extracting edge information from an output of step (c1);
    (c3) down sampling at a first predetermined ratio an output from step (c2);
    (c4) applying plurality of eye templates to an output step (c3);
    (c5) determining which one of the plurality of eye templates corresponds to the output of step (c3); and
    (c6) aligning the face of the image inputted in step (a) in accordance with step (c5).

44. A method of face recognition comprising the steps of:
    (a) inputting an image of a subject;
    (b) determining if a face is present in the image output of step (a);
    (c) determining a position of the face in the image if step (b) determines that the face is -present, wherein step (c) comprises the steps of:
        (c1) lumen normalizing an output of step (b);
        (c2) extracting edge information from an output of step (c1):
        (c3) down sampling at a first predetermined ratio an output from step (c2):
        (c4) applying a plurality of eye templates to an output of step (c3);
        (c5) determining which one of the plurality of eye templates corresponds to the output of step (c3); and
        (c6) aligning the face of the image inputted in step (a) in accordance with step (c5);
    (d) extracting at least first and second facial features from the face output by step (c); and
    (e) comparing the first and second facial features output by step (d) to identify the face with a database of facial features;
    wherein step (c4) applies an eye template to a first side of the face and a mirror image of the eye template to a second side of the face.

45. A method according to claim 43, wherein step (c4) applies an eye template comprising a right eye and a left eye.

46. A method of face recognition comprising the steps of:
    (a) inputting an image of a subject;
    (b) determining if a face is present in the image output of step (a);
    (c) determining a position of the face in the image if step (b) determines that the face is present, wherein step (c) comprises the steps of:
        (c1) lumen normalizing an output of step (b);
        (c2) extracting edge information from an output of step (c1);
        (c3) down sampling at a first predetermined ratio an output from step (c2);
        (c4) applying a plurality of eye templates to an output of step (c3);
        (c5) determining which one of the plurality of eye templates corresponds to the output of step (c3); and
        (c6) aligning the face of the image inputted in step (a) in accordance with step (c5);
    (d) extracting at least first and second facial features from the face output by step (c); and
    (e) comparing the first and second facial features output by step (d) to identify the face with a database of facial features;
    wherein if step (c5) does not determine that any one of the plurality of eye templates corresponds to the output of step (c3), step (c3) down samples at a second predetermined ratio the output signal from step (c2).

47. A method of face recognition comprising the steps of:
    (a) inputting an image of a subject;
    (b) determining if a face is present in the image output of step (a);
    (c) determining a position of the face in the image if step (b) determines that the face is present;
    (d) extracting at least first and second facial features from the face output by step (c); and
    (e) comparing the first and second facial features output by step (d) to identify the face with a database of facial features;
    wherein step (d) comprises the steps of:
        (d1) cropping at least a first facial feature and a second facial feature output by step (c);
        (d2) lumen normalizing the first facial feature and the second facial feature output by step (d1);

(d3) extracting edge information from the first facial feature and the second facial feature output by step (d2);

(d4) down sampling at a first predetermined ratio the first facial feature and at a second predetermined ratio the second facial feature output signal by step (d3); and (d5) calculating a first feature vector of the first facial feature from step (d4) and a second feature vector of the second facial feature output from step (d4).

48. A method according to claim 47, wherein the first predetermined ratio is greater than the second predetermined ratio.

49. A method according to claim 47, further comprising the steps of (d6) cropping a third facial output by output by step (c);

(d7) lumen normalizing the third facial feature output by step (d6);

(d8) extracting edge information from the third facial feature output step (d7);

(d9) down sampling at a third predetermined ratio the third facial feature output by step (d8); and (d10) calculating a third feature vector of the third facial feature from (d9).

50. A method according to claim 49, wherein the first predetermined ratio is greater than the second predetermined ratio, and wherein the second ratio is greater than the third ratio.

51. A method of face recognition comprising the steps of:

(a) inputting an image of a subject;

(b) determining if a face is present in the image output of step (a);

(c) determining a position of the face in the image if step (b) determines that the face is present;

(d) extracting at least first and second facial features from the face output by step (c); and (e) comparing the first and second facial features output by step (d) to identify the face with a database of facial features;

wherein step (d) comprises the steps of:

(d1) cropping at least a first facial feature and a second facial feature output by step (c);

(d2) down sampling at a first predetermined ratio the first facial feature and at a second predetermined ratio the second facial feature output signal by step (d1); and (d3) calculating a first feature vector of the first facial feature from step (d2) and a second feature vector of the second facial feature output from step (d2).

52. A method according to claim 51, wherein the first predetermined ratio is greater than the second predetermined ratio.

53. A method according to claim 51, further comprising the steps of:

(d4) cropping a third facial output by step (c);

(d5) down sampling at a third predetermined ratio the third facial feature output by step (d4); and (d6) calculating a third feature vector of the third facial feature from step (d5).

54. A method according to claim 53, wherein the first predetermined ratio is greater than the second predetermined ratio, and wherein the second ratio is greater than the third ratio.

55. A method according to claim 47, wherein step (e) comprises the steps of:

(e1) comparing the first feature vector calculated in step (5) with corresponding first feature vectors of a database of candidates;

(e2) comparing the second feature vector calculated in step (5) with corresponding second features of the database of candidates; and (e3) selecting one of the candidates in the database in accordance with one step (e1) and step (e2).

56. A method according to claim 40, wherein step (e) comprises the steps of:

(e1) comparing the first feature extracted in step (d) with corresponding first features of a database of candidates;

(e2) comparing the second feature extracted in step (d) with corresponding second features of the database of candidates; and (e3) selecting one of the candidates in the database in accordance with one step (e1) and step (e2).

57. A method according to claim 40, wherein step (b) comprises a neural network.

58. A method according to claim 40, wherein step (c) comprises a neural network.

59. A method according to claim 40, wherein step (d) comprises a neural network.

60. A method of face recognition comprising the steps of:

(a) generating an image of a subject;

(b) determining a position of a face in the image from step (a) including applying an eye template to a first side of the face and a mirror image of the eye template to a second side of the face;

(c) extracting at least two facial features from the face determined in step (b); and (d) comparing the extracted facial features of step (c) with a database of extracted facial features to identify the face.

61. A method according to claim 60, wherein step (b) comprises a neural network.

62. A method according to claim 60, wherein step (c) comprises a neural network.

63. A face recognition system comprising:

input means for inputting an image of a subject;

face detector means for determining if a face is present in the image output by said input means;

face position registration means for determining a position of the face in the image if said face detector means determines that the face is present, said face position registration means comprising eye template means for applying an eye template to a first side of the face and a mirror image of the eye template to a second side of the face;

feature extractor means for extracting at least first and second facial features from the face in accordance with the position determined by said face position registration means; and voting means for comparing the at least two extracted facial features with a database of corresponding facial features to identify the face.

64. A face recognition system according to claim 63, wherein said face detector means comprises:

Lumen normalization means for lumen normalizing the output by said input means;

edge extraction means for extracting edge information from an output of said lumen normalization means;

down sampling means for down sampling at a predetermined ratio an output signal from said edge extraction means;

facial template means for applying plurality of facial templates to an output of said down sampling means; and facial template matching means for determining which one of the plurality of facial templates corresponds to the output of said down sampling means.

65. A face recognition system according to claim 64,
wherein the image output by said input means comprises M×N pixels, wherein M and N are positive integers,
wherein said down sampling means comprises:
 low pass filtering means to filter the M×N pixels;
 sampler means for sampling every nth pixel from said low pass filter to output M/n×N/n pixels, wherein n is a positive integer.

66. A face recognition system according to claim 63, wherein said face position registration means comprises:
 Lumen normalization means for lumen normalizing an output by said face detector means;
 edge extraction means for extracting edge information from an output of said lumen normalization means;
 down sampling means for down sampling at a first predetermined ratio an output signal from said edge extraction means;
 eye template means for applying a plurality of eye templates to an output of said down sampling means;
 eye template matching means for determining which one of the plurality of eye templates corresponds to the output of said down sampling means; and
 face alignment means for aligning the face of the image output by said input means in accordance with said eye matching means.

67. A face recognition system comprising:
input means for inputting an image of a subject;
face detector means for determining if a face is present in the image output by said input means;
face position registration means for determining a position of the face in the image if said face detector means determines that the face is present, said face position registration means comprising:
 lumen normalization means for lumen normalizing an output by said face detector means;
 edge extraction means for extracting edge information from an output of said lumen normalization means;
 down sampling means for down sampling at a first predetermined ratio an output signal from said edge extraction means;
 eye template means for applying a plurality of eye templates to an output of said down sampling means;
 eye template matching means for determining which one of the plurality of eye templates corresponds to the output of said down sampling means; and
 face alignment means for aligning the face of the image output by said input means in accordance with said eye matching means;
feature extractor means for extracting at least first and second facial features from the face in accordance with the position determined by said face position registration means; and
voting means for comparing the at least two extracted facial features with a database of corresponding facial features to identify the face;
wherein said eye template means applies an eye template to a first side of the face and a mirror image of the eye template to a second side of the face.

68. A face recognition system according to claim 66, wherein said eye template means applies an eye template comprising a right eye and a left eye.

69. A face recognition system comprising:
input means for inputting an image of a subject;
face detector means for determining if a face is present in the image output by said input means;
face position registration means for determining a position of the face in the image if said face detector means determines that the face is present, said face position registration means comprising:
 lumen normalization means for lumen normalizing an output by said face detector means;
 edge extraction means for extracting edge information from an output of said lumen normalization means;
 down sampling means for down sampling at a first predetermined ratio an output signal from said edge extraction means;
 eye template means for applying a plurality of eye templates to an output of said down sampling means;
 eye template matching means for determining which one of the plurality of eye templates corresponds to the output of said down sampling means; and
 face alignment means for aligning the face of the image output by said input means in accordance with said eye matching means;
feature extractor means for extracting at least first and second facial features from the face in accordance with the position determined by said face position registration means; and
voting means for comparing the at least two extracted facial features with a database of corresponding facial features to identify the face;
wherein if said eye matching means does not determine that any one of the plurality of eye templates corresponds to the output of said down sample means, said down sampling means down samples at a second predetermined ratio the output signal from said edge extraction means.

70. A face recognition system comprising:
input means for inputting an image of a subject;
face detector means for determining if a face is present in the image output by said input means;
face position registration means for determining a position of the face in the image if said face detector means-determines that the face is present;
feature extractor means for extracting at least first and second facial features from the face in accordance with the position determined by said face position registration means; and
voting means for comparing the at least two extracted facial features with a database of corresponding facial features to identify the face;
wherein said feature extraction means comprises:
 cropping means for cropping at least the first facial feature and the second facial feature output by said face position registration means;
 lumen normalization means for lumen normalizing the first facial feature and the second facial feature output by said cropping means;
 edge extraction means for extracting edge information from the first facial feature and the second facial feature output by said lumen normalization means;
 down sampling means for down sampling at a first predetermined ratio the first facial feature and at a second predetermined ratio the second facial feature output signal by said edge extraction means; and feature vector calculating means for calculating a first feature vector of the first facial feature from said down sampling means and a second feature vector of the second facial feature output from said down sampling means.

71. A face recognition system according to claim 70, wherein the first predetermined ratio is greater than the second predetermined ratio.

72. A face recognition system according to claim 70, wherein said cropping means crops a third facial output by said face position registration means;

wherein said lumen normalization means lumen normalizes the third facial feature output by said cropping means detector means;

wherein said edge extraction means extracts edge information from the third facial feature output by said lumen normalization means;

wherein said down sampling means down samples at a third predetermined ratio the third facial feature output by said extraction means; and wherein said feature vector calculating means calculates a third feature vector of the third facial feature from said down sampling means.

73. A face recognition system according to claim 72, wherein the first predetermined ratio is greater than the second predetermined ratio, and wherein the second ratio is greater than the third ratio.

74. A face recognition system comprising:

input means for inputting an image of a subject;

face detector means for determining if a face is present in the image output by said input means;

face position registration means for determining a position of the face in the image if said face detector means determines that the face is present;

feature extractor means for extracting at least first and second facial features from the face in accordance with the position determined by said face position registration means; and voting means for comparing the at least two extracted facial features with a database of corresponding facial features to identify the face;

wherein said feature extraction means comprises:

cropping means for cropping at least a first facial feature and a second facial feature output by said face position registration means;

down sampling means for down sampling at a first predetermined ratio the first facial feature and at a second predetermined ratio the second facial feature output signal by said cropping means; and feature vector calculating means for calculating a first feature vector of the first facial feature from said down sampling means and a second feature vector of the second facial feature output from said down sampling means.

75. A face recognition system according to claim 74, wherein the first predetermined ratio is greater than the second predetermined ratio.

76. A face recognition system according to claim 74, wherein said cropping means crops a third facial output by said face position registration means;

wherein said down sampling means down samples at a third predetermined ratio the third facial feature output by said cropping means; and wherein said feature vector calculating means calculates a third feature vector of the third facial feature from said down sampling means.

77. A face recognition system according to claim 74, wherein said voting means comprises first recognizer means for comparing the first feature vector with corresponding first feature vectors of a database of candidates;

second recognizer means for comparing the second feature vector with corresponding second feature vectors of the database of candidates; and selection means of selecting one of the candidates in the database in accordance with one of said first recognizer means and said second recognizer means.

78. A face recognition system according to claim 76, wherein the first predetermined ratio is greater than the second predetermined ratio, and wherein the second ratio is greater than the third ratio.

79. A face recognition system according to claim 70, wherein said voting means comprises first recognizer means for comparing the first feature with corresponding first features of a database of candidates;

second recognizer means for comparing the second feature with corresponding second features of the database of candidates; and selection means of selecting one of the candidates in the database in accordance with one of said first recognizer means and said second recognizer means.

80. A face recognition system according to claim 63, wherein said feature extractor means comprises a neural network.

81. A face recognition system comprising:

input means for inputting an image of a subject;

face position registration means for determining a position of a face in the image output from said input means, said face position registration means comprising eye template means for applying an eye template to a first side of the face and a mirror image of the eye template to a second side of the face;

feature extractor means for extracting at least first and second facial features from the face; and voting means for comparing the first and second facial features extracted by said feature extractor means with a database of extracted facial features to identify the face.

82. A face recognition system according to claim 81, wherein said face position registration means comprises a neural network.

83. An article of manufacture, comprising a computer usable medium having readable code means embodied therein for face recognition, the computer readable program code means comprising:

input computer readable program code means for inputting an image of a subject;

face detector computer readable program code means for determining if a face is present in the image from said input computer readable program code means;

face position registration computer readable program code means for determining a position of the face in the image if said face detector computer readable program code means determines that the face is present, said face position registration computer readable program code means comprising computer readable program code means for applying an eye template to a first side of the face and a mirror image of the eye template to a second side of the face;

feature extractor computer readable program code means for extracting at least first and second facial features from the face in accordance with the position determined by said face position registration computer readable program code means; and voting computer readable program code means for comparing the at least two extracted facial features with a database of corresponding facial features to identify the face.

84. An article of manufacture according to claim 83, wherein said face detector computer readable program code mean comprises a neural network.

85. An article of manufacture according to claim 83, wherein said face position registration computer readable program code mean comprises a neural network.

86. An article of manufacture according to claim 83, wherein said feature extractor computer readable program code mean comprises a neural network.

87. A face recognition system comprising:

a control panel having an input circuit and a display;

a video camera for inputting an image of a subject in response to said control panel;

a face detector for determining if a face is present in the image output by said video camera, if the face is not present a message is displayed by said display;

a face position registration circuit for determining a position of the face in the image if said face detector determines that the face is present, said face position registration circuit comprising an eye template circuit that applies an eye template to a first side of the face and a mirror image of the eye template to a second side of the face;

a feature extractor for extracting at least first and second facial features from the face in accordance with the position determined by said face position registration circuit;

a face sever comprising a database of corresponding features of potential candidates; and voting circuit for comparing the at least two extracted facial features with the database from said face server to identify the face.

88. A face recognition system according to claim 87, wherein said face detector comprises a neural network.

89. A face recognition system according to claim 87, wherein said face position registration circuit comprises a neural network.

90. A face recognition system according to claim 87, wherein said feature extractor comprises a neural network.

* * * * *

UNITED STATES PATENT AND TRADEMARK OFFICE
CERTIFICATE OF CORRECTION

PATENT NO. : 6,108,437
DATED : August 22, 2000
INVENTOR(S) : Shang-Hung Lin

It is certified that error appears in the above-identified patent and that said Letters Patent is hereby corrected as shown below:

Column 15, Line 63; delete "-" before "present".

Column 20, Line 46; delete "-" after "means".

Signed and Sealed this

Twenty-ninth Day of May, 2001

Attest:

NICHOLAS P. GODICI

*Attesting Officer*   *Acting Director of the United States Patent and Trademark Office*